UNITED STATES PATENT OFFICE 2,617,199

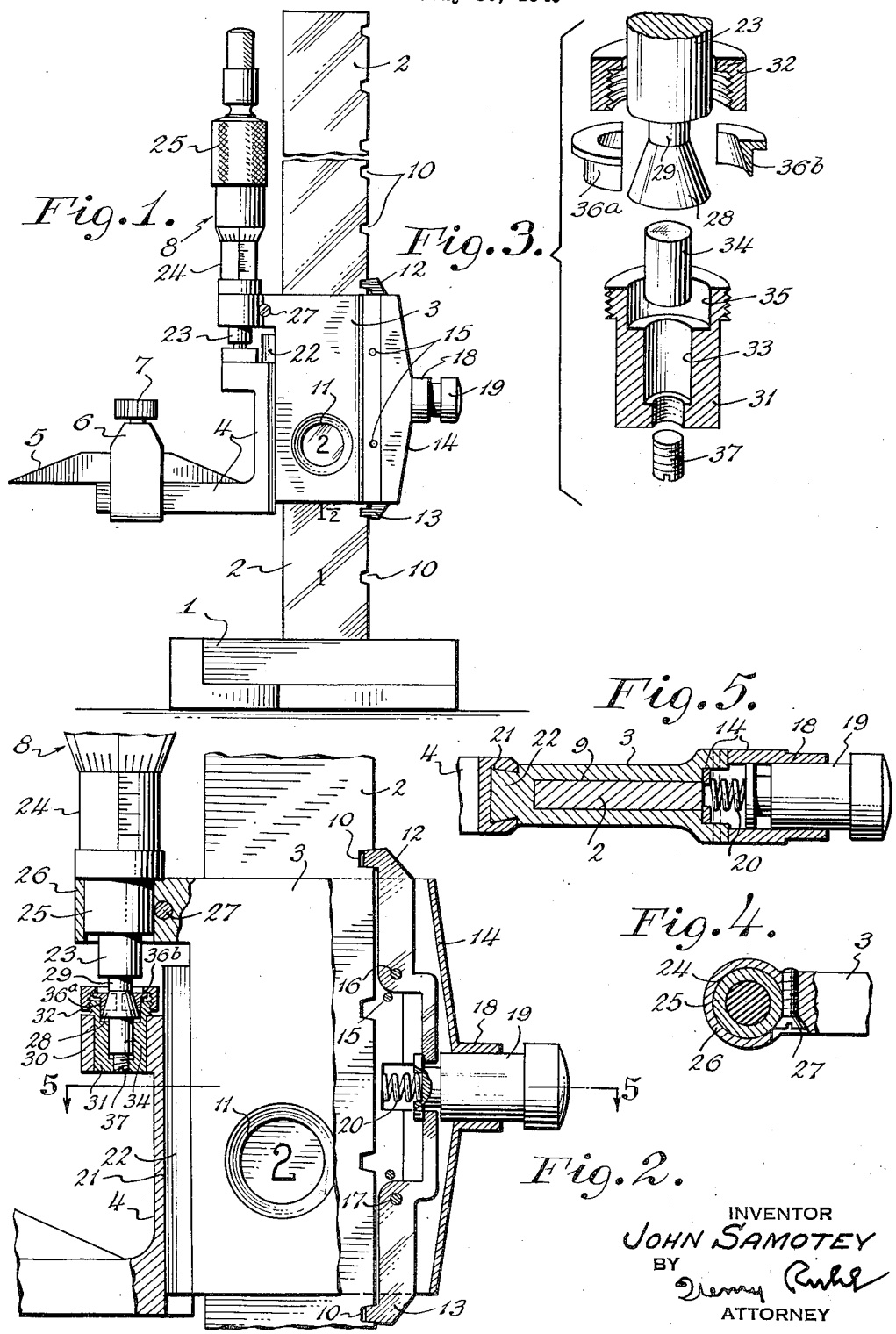
Nov. 11, 1952 — J. SAMOTEY — 2,617,199
GAUGE
Filed July 18, 1949
INVENTOR
JOHN SAMOTEY
BY
ATTORNEY

GAUGE

John Samotey, Brooklyn, N. Y.

Application July 18, 1949, Serial No. 105,315

5 Claims. (Cl. 33—170)

It is customary in connection with machine work and the like to employ gauges wherein, for accuracy in measurement, the gauge comprises a main or principal scale and also a vernier scale which is read in connection with the principal scale. There are, in practice, several major disadvantages experienced in connection with the use of such gauges of former constructions. For example, since the same principal scale is employed in obtaining a coarse and vernier measurement, the gauge must be carefully read with skill in order to make sure of the coarse and vernier reading, and this usually requires considerable time with a high probability of error. Additionally, such gauges are not adapted for quick adjustment to an approximate value of the specimen to be measured, nor, for being securely held in such position while the vernier adjustments are made in measuring various specimens.

It is therefore the primary object of my invention to provide a gauge which may be quickly adjusted to a position providing a coarse measurement and locked in such position without danger of such adjustment being inadvertently altered while the vernier adjustment is being made. It is also an object of my invention to provide a gauge in which the vernier adjustment is made in connection with a scale providing a direct reading of the vernier amount without requiring any involved mental calculations or the like. It is a still further object to provide a gauge which may be readily adjusted to the nearest approximate measurement of a specimen being gauged and which will remain locked in this position while the vernier adjustment is made, and a gauge, the scales of which may be readily read with accuracy and with a minimum probability of error.

It is also an object of this invention to provide a gauge wherein the vernier adjustment is accomplished by means of a micrometer screw, the vernier measurement being read directly from the scale thereof. It is also an object to provide a coupling in a gauge of the foregoing character whereby rotational movement of the micrometer screw will impart translational movement to the gauge jaw without relative translational movement occurring between the micrometer screw and jaw thereby providing accurate vernier measurements.

With the foregoing and still further objects in view, my invention includes the novel elements, and the combinations and arrangements thereof, described below and illustrated in the accompanying drawings, in which—

Fig. 1 is an elevation view of a preferred embodiment of my invention. Fig. 2 is a fragmentary elevation view, somewhat enlarged and partially in section of the gauge of Fig. 1. Fig. 3 is an exploded view, partially in section, of the novel coupling element of my invention. Fig. 4 is a detailed view showing one manner in which the micrometer adjusting means is secured to the carriage of the gauge; and Fig. 5 is a fragmentary sectional view taken in about the plane 5—5 of Fig. 2.

Briefly, the gauge of my invention is of the type comprising a base having a gauge bar upstanding therefrom and along which a carriage is movable for measurement purposes. As illustrated in Fig. 1, the base is indicated at 1 and has secured thereto the gauge bar 2 which extends therefrom in upstanding relation. A carriage indicated generally at 3 is slidably supported on the bar 2 and carries the gauge jaw 4 to which the jaw extension 5 is secured as by means of a clamp 6 including the knurled thumb screw 7. The jaw 4 is slidably mounted on the carriage 3 and it is movable relative thereto in a translational manner, toward and away from the base 1, by means of the micrometer screw mechanism indicated generally at 8.

In accordance with my invention and for coarse measurement purposes the carriage 3, as more particularly shown in Fig. 5, is provided with an interior rectangular opening 9 therein to accommodate the bar 2. In this manner the carriage may be slid lengthwise of the bar without any appreciable lateral movement relative thereto. The bar 2 is provided with a plurality of spaced reentrant portions or notches 10 which are preferably so disposed with respect to the base 1 as to provide predetermined coarse measurements on the scale with which the bar is provided. For example, the measurement so provided may be read through an opening 11 in the side of the carriage as shown in Fig. 1. For the purpose of securing the carriage in its coarse-measuring positions as determined by the notches 10 in the gauge bar, I provide the carriage 3 with latches 12 and 13 which are designed at one end thereof to engage the spaced notches, respectively, in the gauge bar. Preferably, the notches taper inwardly and the latch ends are also outwardly tapered to provide a wedging action to insure locking and accuracy in positioning the carriage. These latches, as more particularly shown in Fig. 2, are pivotally supported within a housing 14 which is securely fastened to the carriage 3 by means of screws 15. The latch 12 is pivotally supported in the housing 14 by means of pin 16, and, similarly, the latch 13 is pivotally supported by pin 17. Within a boss 18, formed on the housing 14, is slidably disposed a plunger or button 19. The inner end of the button is provided with a peripheral groove within which the inner ends of the latches 12 and 13 are adapted to lie. A compression spring 20 is interposed between the inner end of the button 19 and the inner surface of housing 14. By depressing the button against the action of spring 20, the two latches are pivoted and thereby withdrawn from the notches they may be engaging in the gauge bar 2. The carriage may then be slid longitudinally of the bar to any other desired position wherein the latches, upon releasing the button, will be resiliently forced into the notches in the gauge bar, or, will ride the surface of the bar until slid to a position wherein they can enter the notches. The notches are so related with respect to the principal scale on the gauge bar that the carriage will be securely locked thereto by means of the latches at predetermined positions thereof spaced from the base 1 of the gauge as represented by the scale indicia which may be read through the opening or window on the side of the carriage.

The vernier measurement of a specimen, of course, is made with the jaw 4 or jaw extension 5. In accordance with my invention, the jaw 4 is provided with a dove tail slot 21 therein which engages a rib 22 of complementary shape formed on the carriage 3. In this manner, the jaw may be slid longitudinally of the carriage 3 and with no appreciable lateral movement relative thereto. For effecting translational movement of the jaw 4 and in accordance with my invention, I provide a micrometer screw of conventional form which comprises the usual spindle 23, sleeve 24, and thimble 25. The thimble is mounted within a cylindrical opening formed in an extension or boss 26 of the carriage 3 as more particularly shown in Fig. 4. The micrometer thimble is securely fastened within the opening as, for example, by means of screw 27, the head of which engages the sleeve of the micrometer and securely wedges it within the boss to prevent any relative movement therebetween.

The spindle of the micrometer is connected with the jaw 4, preferably in the novel manner hereinafter described whereby rotational movement of the spindle will produce translational movement of the jaw but without relative translational movement therebetween. This coupling is shown in detail in Figs. 2 and 3. In the embodiment shown, the end of the spindle 23 is turned down to form a frusto-conical portion 28 which is joined to the major portion of the spindle by a reduced cylindrical portion 29. The jaw 4 is provided at one end with a boss 30 within which is secured a coupling member 31 having screw threads at one end thereof, adapted to engage the interior screw threads of a coupling nut 32. The member 31 is provided with a cylindrical bore 33 therein adapted to receive a cylindrical block 34. At the threaded end of the member 31 is a cylindrical bore 35 of greater diameter than bore 33 which is adapted to accommodate the frusto-conical end of the spindle 23. A bearing member illustrated as a collar comprising the two halves 36a and 36b is provided with an interior frusto-conical shape complementary to that of the end of the spindle. A screw-threaded opening in the end of the member 31 is adapted to receive a set screw 37.

The assemblage of this coupling is accomplished by placing the cylindrical block 34 within the bore 33, positioning the frusto-conical end of the spindle within the bore 35, positioning the two halves of the split collar 36a and 36b to surround the frusto-conical end of the spindle, and then screw threading the coupling nut 32 to the member 31. Thereafter, the set screw 37 is positioned to adjust the block 34 axially of the spindle and to an extent sufficient to prevent relative axial movement between the spindle and the gauge jaw while permitting rotation of the spindle relative to the gauge jaw. If desired, the frusto-conical end of the spindle may be preformed and affixed to the cylindrical spindle in any desired fashion.

The sleeve of the micrometer is provided with the usual scale markings and this is true also of the thimble. In operation, the carriage is adjusted along the gauge bar 2 to a position providing the closest coarse measurement of a given specimen and to a position wherein the latches 12 and 13 engage notches 10 in the gauge bar. Thereafter, the micrometer screw is adjusted to provide a vernier measurement such that the two measurements may be accurately and quickly combined to provide a total or final measurement. Preferably, the parts are so arranged that the vernier measurement, read on the micrometer, may be added to the coarse measurement read through the window of the carriage.

While I have described my invention in its preferred embodiment, it is to be understood that the words which I have used are words of description rather than of limitation and that changes within the purview of the appended claims may be made without departing from the true scope and spirit of my invention in its broader aspects.

What I claim is:

1. In a gauge comprising a gauge bar, a jaw, a carriage carrying said jaw and slidably mounted on said gauge bar, means for adjusting said jaw relative to said carriage comprising a micrometer screw mechanism having its body secured to said carriage and its shaft being adapted to operate said jaw, means for guiding the movement of said jaw relative to said carriage and a swivel connection between the shaft of said micrometer screw mechanism and said jaw, said connection including a frusto-conical end portion on said shaft, a reentrant portion in said jaw within which said end portion is received, a bearing member having a substantially complementary configuration to said end portion disposed to surround and engage said end portion, means for securing said bearing member to said jaw, and means for preventing axial movement of said end portion relative to said bearing member whereby rotary movement of said shaft without axial movement thereof relative to said jaw may occur.

2. In a gauge comprising a gauge bar, a jaw, a carriage carrying said jaw and slidably mounted on said gauge bar, means for adjusting said jaw relative to said carriage comprising a micrometer screw mechanism having its body secured to said carriage and its shaft being adapted to operate said jaw, means for guiding the movement of said jaw relative to said carriage and a swivel connection between the shaft of said micrometer screw mechanism and said jaw, said connection including a frusto-conical end portion on said shaft tapering toward said shaft, a reentrant portion in said jaw within which said end portion is received, a split collar having a substantially complementary configuration to said end portion disposed to surround and engage said end portion, a threaded nut for securing said bearing member to said jaw, and means for preventing axial movement of said end portion relative to said bearing member whereby rotary movement of said shaft without axial movement thereof relative to said jaw may occur.

3. In a gauge comprising a gauge bar, a jaw, a carriage carrying said jaw and slidably mounted on said gauge bar, means for adjusting said jaw relative to said carriage comprising a micrometer screw mechanism having its body secured to said carriage and its shaft being adapted to operate said jaw, means for guiding the movement of said jaw relative to said carriage, and a swivel connection between the shaft of said micrometer screw mechanism and said jaw, said connection including a frusto-conical end portion on said shaft tapering toward said shaft, a reentrant portion in said jaw within which said end portion is received, a bearing member having a substantially complementary configuration to said end portion disposed to surround and engage said end portion means for securing said bearing member to said jaw, and means adapted to engage the end portion of said shaft and including screw-threaded means threadedly engaging said jaw for preventing axial movement of said shaft relative to said jaw while affording rotary movement of said shaft.

4. In a gauge comprising a gauge bar, a jaw, a carriage carrying said jaw and slidably mounted on said gauge bar, means for adjusting said jaw relative to said carriage comprising a micrometer screw mechanism having its body secured to said carriage and its shaft being adapted to operate said jaw, means for guiding the movement of said jaw relative to said carriage, and a swivel connection between the shaft of said micrometer screw mechanism and said jaw, said connection including a tapered end portion on said shaft tapering toward said shaft, a reentrant portion in said jaw within which said end portion is received, a split bearing member having a substantially complementary configuration to said end portion, means for securing said bearing member to said jaw, and adjustable means adapted to engage the end portion of said shaft and including screw-threaded means threadedly engaging said jaw for preventing axial movement of said shaft relative to said jaw while affording rotary movement of said shaft.

5. A gauge comprising a gauge bar having a scale, a jaw, a carriage carrying said jaw and slidably mounted on said gauge bar, said bar having spaced detents therein, a pair of locking levers pivotally mounted on said carriage and having laterally protruding ends so spaced as to simultaneously engage two spaced detents, a plunger slidably supported on said carriage to extend outwardly therefrom and connected to simultaneously operate said levers, a spring operatively positioned between said carriage and plunger for normally urging said levers into engagement with said detents and said plunger in an outwardly direction, whereby said carriage may be grasped in one hand to exert inward pressure on said plunger thereby releasing said levers from engagement with said detents and permitting the carriage to be slid longitudinally of said gauge bar.

JOHN SAMOTEY.

REFERENCES CITED

The following references are of record in the file of this patent:

UNITED STATES PATENTS

| Number | Name | Date |
|---|---|---|
| 596,346 | Wallgren | Dec. 28, 1897 |
| 1,282,030 | Benemelis | Oct. 22, 1918 |
| 1,334,217 | Blomberg | Mar. 16, 1920 |
| 2,207,625 | Lester | July 9, 1940 |
| 2,400,715 | Sandberg | May 21, 1946 |

FOREIGN PATENTS

| Number | Country | Date |
|---|---|---|
| 255,455 | Switzerland | June 30, 1948 |